UNITED STATES PATENT OFFICE.

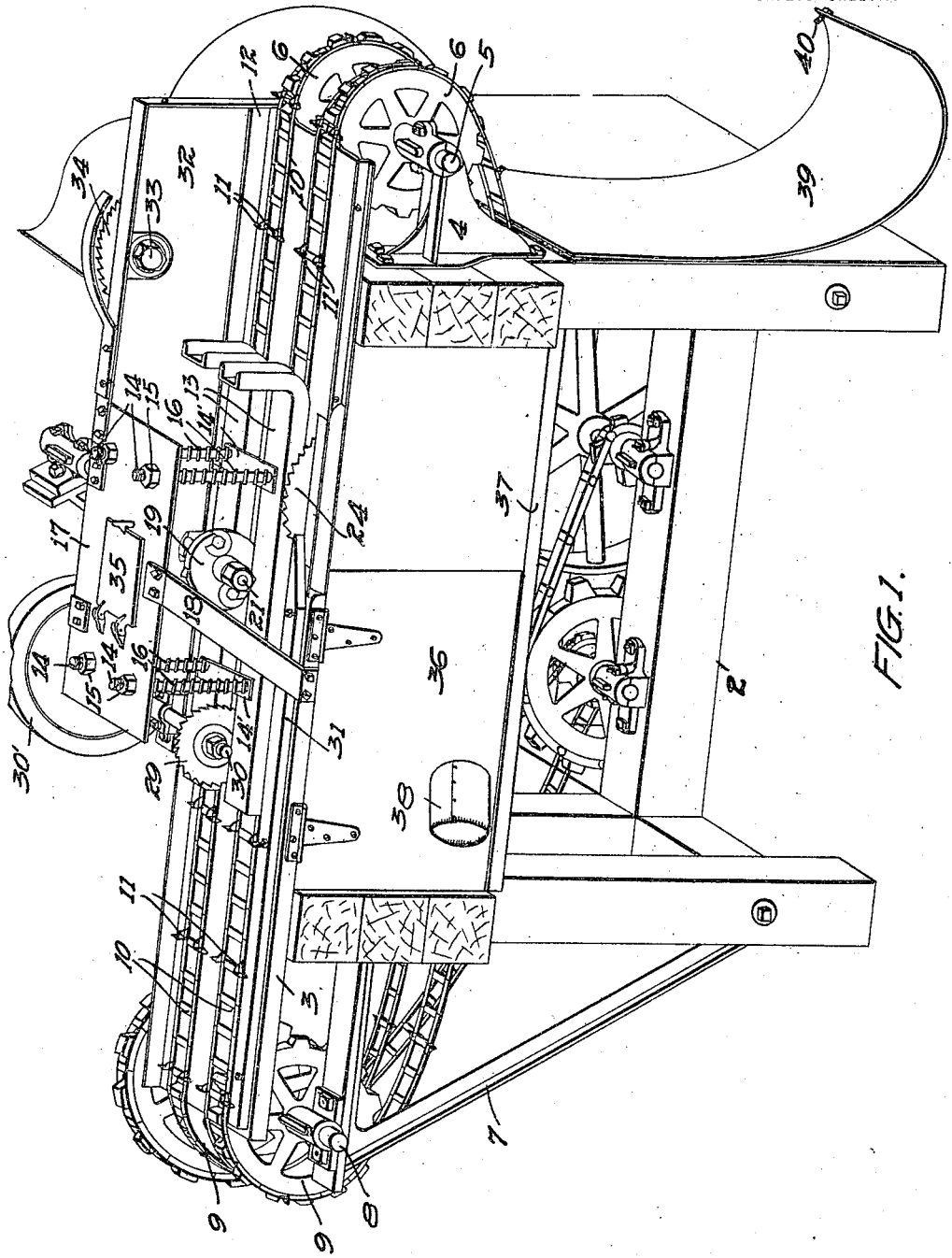

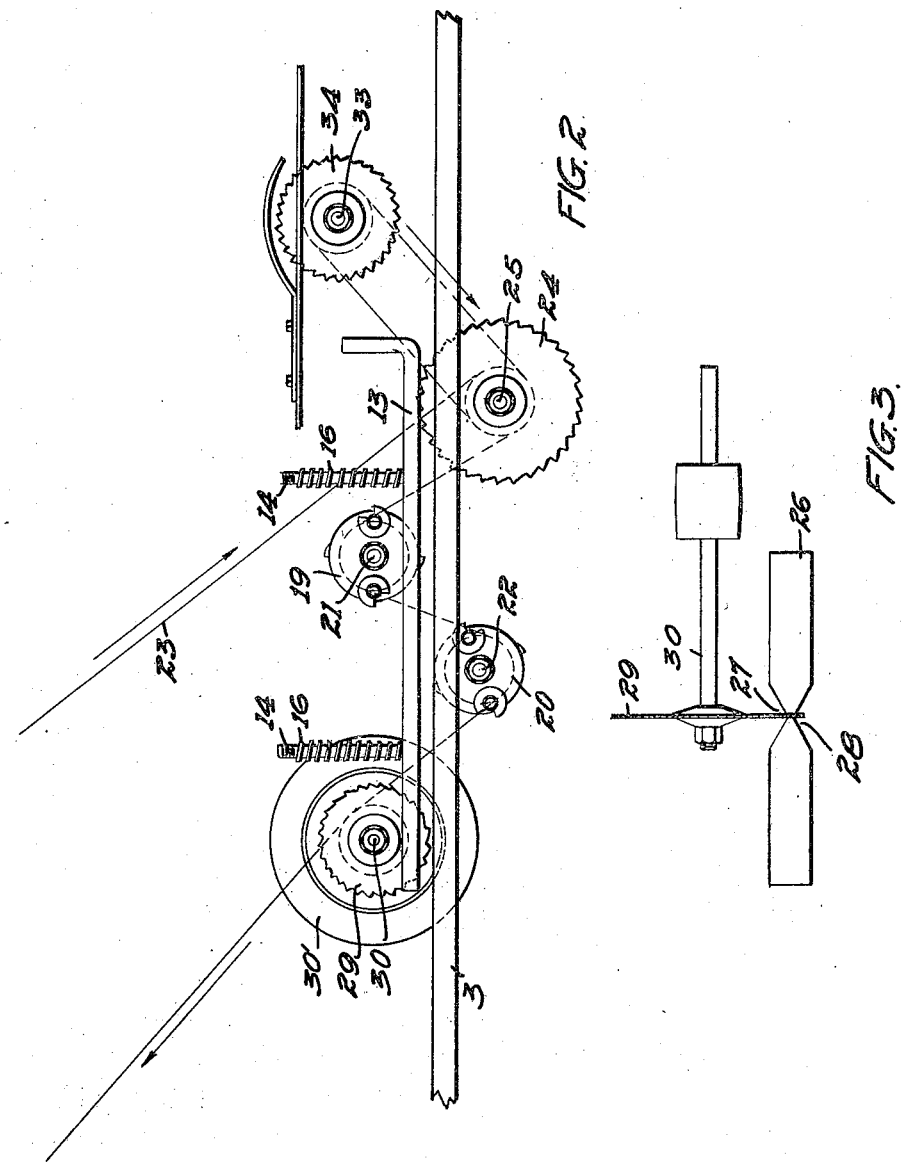

HARRY G. SMART, OF ST. CLOUD, MINNESOTA.

TIE-PLUG MACHINE.

1,255,060.　　　Specification of Letters Patent.　　Patented Jan. 29, 1918.

Application filed May 14, 1915. Serial No. 28,061.

*To all whom it may concern:*

Be it known that I, HARRY G. SMART, a citizen of the United States, residing at St. Cloud, in the county of Stearns and State of Minnesota, have invented certain new and useful Improvements in Tie-Plug Machines, of which the following is a specification.

This invention relates to improvements in machines for cutting and pointing small wooden plugs used for filling the holes in railway ties where the spikes have been removed, to prevent water from entering said holes and causing decay of the ties, and is particularly an improvement on the machine shown and described in my Reissued Letters Patent No. 13,579, granted June 17, 1913.

The object of the invention is to provide an automatic machine through which small strips of material of proper size for forming the plugs may be passed, a beveled recess being formed in each side of the blank and the portions of the blank being thereafter severed by a suitable saw, thereby forming two plugs out of each blank.

The invention consists generally in the constructions and combinations hereinafter described and particularly pointed out in the claims.

In the accompanying drawings forming part of this specification,

Figure 1 is a perspective view of a machine embodying my invention,

Fig. 2 is a side elevation showing the arrangement of various elements of the machine, Fig. 3 is a detail showing the means for severing the recessed blanks and thereby forming two plugs out of each blank.

In the drawings, 2 represents the frame of the machine, which may be of any suitable size and construction. This frame has secured to its top a suitable plate 3, and this plate and the frame 2 together conveniently constitute an operating table. At the forward or receiving end of the machine I provide brackets 4, which form bearings for a shaft 5 provided with sprocket wheels 6, 6. The other end of the frame is provided with brackets 7 upon which is mounted a shaft 8 carrying sprocket wheels 9, 9. Endless link chains or carriers 10 extend across the table passing around the sprocket wheels 6, 6 and 9, 9, and these chains are provided with suitable lugs 11 adapted to engage the plug blanks and move them through the machine.

One side of the machine is provided with a suitable guide plate 12 against which the ends of the plug blanks abut and along which they slide as the blanks are moved through the machine. Above the table and the conveyer chain are a pair of presser bars 13, 13. These bars are preferably made of short sections of U-bars having their forward ends turned upwardly with the lower ends of the flanges close to the surface of the table. Each bar is supported by a pair of vertically movable rods 14 having threaded upper ends provided with nuts 15. The lower ends of the rods 14 are secured to the bars 13 and said rods are surrounded by spiral springs 16. The rods 14 preferably pass through openings in spacing plates 14′ which steady the lower ends of the rods and keep them and the presser bars at the right distance apart. The upper ends of the rods 14 pass through a stationary plate 17 supported upon the frame of the machine and having preferably suitable braces 18. The upper ends of the springs 16 bear against the under surface of the plate 17, and the presser bars 13 can be adjusted by means of the nuts 15.

The machine is also provided with the upper and lower cutter heads 19 and 20 mounted upon shafts 21 and 22, the lower cutter head being arranged to operate through suitable openings or recesses in the plate 3 of the table. The cutter heads are not arranged directly one above the other, but one of the cutter heads, preferably the upper one, is arranged somewhat nearer the forward end of the machine, as shown in Fig. 2 of the drawings. The shafts 21 and 22 are mounted in suitable bearings and these shafts are rotated preferably by means of a suitable belt 23 as indicated in Fig. 2 of the drawings. A saw 24 is preferably arranged in front of the upper cutter head and preferably at the side of the machine as indicated in Fig. 1 of the drawings. The shaft 25 is mounted in suitable bearings and is preferably driven by the belt 23.

It will be noted that the carrier chains 11 are spaced apart so that said chains pass on opposite sides of the cutter heads, and said cutter heads operate upon the plug blanks substantially midway between said chains, and between the presser bars 13, 13. In Fig. 3 of the drawings I have shown one of the plug blanks 26. The upper cutter head forms a V-shaped recess 27 in the upper surface of said blank and the lower cutter head forms a similar recess 28 in the lower surface of the blank. It is preferable, however, to have said blank cut only partially in two by the cutter heads. If these heads are arranged to entirely sever the blanks, said blanks are apt to be thrown off from the chains by the action of the lower or last operating cutter head. I, therefore, arrange the cutter heads so that they can only partially cut though the blanks as indicated in Fig. 2 of the drawings. To completely sever the blanks I provide a saw 29 mounted upon a suitable shaft 30 supported in suitable bearings, and arranged to be driven by said belt 23. The shaft 30 is preferably provided with a flywheel 30' driven at the desired speed. This saw is located in line with the cutter heads, so that after the blanks have been acted upon by both cutter heads and recesses in the upper and lower surfaces thereof are formed, said blanks will be brought in contact with the saw 29, by which they will be quickly severed without being thrown off from the chains. The severed and completed plugs will be carried forward and discharged from the table as the carrier chains pass around the sprockets 9 at the rear end of the machine.

I preferably provide a deflecting bar 31 having a beveled forward end extending close to the outer surface of the saw 25, by means of which the pieces trimmed off from the ends of the blanks may be directed off from the side of the table.

At the front end of the table I preferably provide an upright plate 32, which extends above the guide plate 12. This plate is preferably provided with a bearing for a shaft 33 carrying an extra saw 34. This saw may be conveniently employed for trimming the ends of blanks should the same be found to be rough or irregular. I also prefer to provide in the plate 17 an opening covered by a door 35. By turning up this door access may be had conveniently to the upper cutter head located below the plate 17. I may also provide a door 36 in the side wall of the frame of the machine and this frame may be provided with a transverse horizontal plate 37, which with the other parts of the frame forms a chamber into which the chips or shavings removed by the cutter head may drop. The door 36 may have a pipe 38 connected thereto and this may be connected to a pipe leading to an exhaust fan by which the chips or shavings may be carried away from the machine. The forward end of the machine may also be provided with a curved shield 39 arranged to cover the conveyer chains where they pass around the sprocket wheels at the forward end of the machine. The shield is shown turned down in Fig. 1. When in use this shield will be turned up over the sprocket wheels and it may be fastened to the plate 32 by a suitable screw 40.

In using this machine tie plugs may be made out of small pieces of scrap material. When the machine is in operation the shield 39 will preferably be turned up so as to cover the sprocket wheels 6, 6, and the carrier chains where they pass around said sprocket wheels. The shield will be preferably fastened to the end of the plate 32 by means of a screw 40 or other suitable device. The operator will stand close to the forward end of the machine at one side thereof and will place the blanks on the chains 10 with their ends against the guide plate 12. If any blank has an uneven end the operator can hold the blanks against the saw 34 for the purpose of trimming their ends. As the blanks are carried forward by the conveyers 10 they pass under the presser bars 13 and the narrow somewhat sharp edges of these bars bear upon the upper surfaces of the blanks with considerable pressure induced by the spiral springs 16. As the blanks pass forward their ends are trimmed by the saw 25. As they pass under the upper cutter head a V-shaped recess is cut in the upper surfaces thereof, and as they pass over the lower cutter head a V-shaped recess is cut in the under surfaces. These recesses, however, do not entirely sever the blank. As said blanks are carried forward by the conveyers they are brought under the saw 29, as indicated in Fig. 3 of the drawings, and by this saw each blank is cut into two plugs each of which has one pointed end. The finished plugs are carried forward by the conveyers and dropped onto the floor or into a suitable receptacle.

I do not limit myself to the details of construction as the same may be varied in many particulars without departing from my invention.

I claim as my invention:

1. The combination, in a tie-plug machine, with a suitable table, of parallel endless conveyers traversing said table, cutter-heads located above and below the table, between said conveyers, parallel spring-controlled presser bars arranged above said table and conveyers, and a saw arranged between said presser bars, in line with said cutter-heads, substantially as described.

2. The combination, in a tie-plug machine, with a suitable table, of parallel endless conveyers traversing said table, cutter-heads located above and below the table between said conveyers, parallel spring-controlled U-shaped presser bars arranged above said table and conveyer, and a suitable saw arranged between said presser bars in line with said cutter heads, substantially as described.

3. The combination, in a tie-plug machine, with a suitable table, of parallel conveyers traversing said table, cutter-heads located above and below said table between said conveyers, parallel spring-controlled presser bars arranged above said table and conveyers, said presser bars being U-shaped in cross section, and arranged with the edges of the flanges extending downward, and a saw arranged between said presser bars in line with said cutter-heads, substantially as described.

In witness whereof, I have hereunto set my hand this 7th day of May 1915.

HARRY G. SMART.